March 12, 1968  E. SNITZER  3,372,969

HIGH RESOLUTION FILTER FOR LASER-EMISSIVE ENERGY

Filed Dec. 6, 1963

INVENTOR.
Elias Snitzer
BY
John A. Harvey
Attorney

United States Patent Office 3,372,969
Patented Mar. 12, 1968

3,372,969
HIGH RESOLUTION FILTER FOR LASER-EMISSIVE ENERGY
Elias Snitzer, Sturbridge, Mass., assignor to American Optical Company, Southbridge, Mass., a voluntary association of Massachusetts
Filed Dec. 6, 1963, Ser. No. 328,710
1 Claim. (Cl. 350—96)

ABSTRACT OF THE DISCLOSURE

A mode selection filter for laser-emissive energy wherein two fiber devices are provided in parallel relationship within an enclosing cladding material which permits fringing of light from one fiber to the other. The laser light is applied to the end of one fiber, which, along with the other fiber, has preselected transverse parameters so that only desired modes are propagated. The length of fibers is then properly chosen so that only one mode will exit from each fiber.

---

Figure 1:
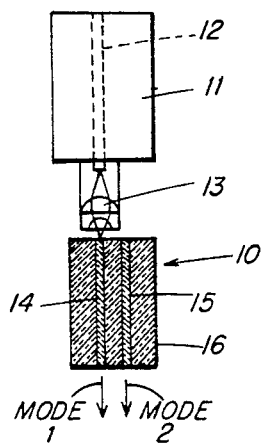

The present invention relates to frequency selective filters for laser emissive energy, and particularly, to passive high-resolution filters for selecting any one or more of a number of relatively closely spaced frequency component modes appearing in the laser energy.

Laser devices employ any of several known laser materials having such atomic structure that active atoms of the material may be raised from a lower energy level to a higher energy level by absorption of pumping light energy. The atomic excitation condition thus created is known as an inversion of atomic energy states. Subsetquent transitions of these atoms from the higher energy level to a lower energy level are accompanied by emission of light energy. Spontaneous transitions of random nature produce incoherent light energy. By placing the material within a so-called resonant structure such as one of the Fabry-Perrot interferometer type having light-reflective terminations of a light propagation path extending through the material, or by using an elongated rod-like material configuration with end reflective terminations, spontaneously emitted laser light is reflected back and forth between the end terminations and effects transition by the stimulation of light emission. This stimulation becomes cumulative in character when the number of higher energy level atoms exceeds the number remaining at the lower energy level by an amount sufficient to supply somewhat more emitted light energy than is lost by reason of various prevailing structural factors and absorption within the laser material. The minimum inversion state at which this cumulative stimulation takes place is called the threshold level of pumping light energy.

Cumulative stimulation produces coherent laser light energy, generally considered monochromatic by reason of its characteristic narrow band of frequencies. It is a narrow band only in relation to the much wider frequency band which characterizes the normal spontaneously emitted light, and the band width is found to increase relatively rapidly with increasing levels of pumping light energy in excess of the threshold level. This increase in band width is occasioned by the appearance in the emitted laser light energy of an increasingly wider spectrum of individual monochromatic lines. Each of these lines is comprised by a band of frequency components of ten kilocycles or less band widths and has significant intensity and an individual propagation mode. These additional lines are due to the excitation of different resonant cavity modes in the resonant structure used to attain cumulative stimulation of light emission. The multiplicity of modes fall roughly into two categories. One concerns stimulation in a given propagation mode, say the $HE_{11}$ mode, of light energy having an integral number N and N+1 half wavelengths. The difference in frequency between two such lines is given by the relation:

$$\Delta v = c/2L$$

where $c$ is the velocity of light in vacuum and L is the spacing of the cavity reflective end terminations. For the $HE_{11}$ mode and reflective end terminations spaced 80 centimeters, the frequency spacing of two such excitation lines is approximately 150 megacycles per second. A Fabry-Perrot interferometer can readily separate two such lines, even though they fall within the natural band width of the normal spontaneously emitted light, since the bandpass required for this purpose is of the order of magnitude of 100 megacycles per second which for a laser light wavelength of 1.1 microns corresponds to a monochromaticity of one part in $10^6$. The other category of mode multiplicity concerns excitation of different dielectric waveguide propagation modes having the same number N or half wavelengths. The frequency difference between the lines resulting from such excited modes is given by the relation $$\Delta v' = 1/2 \frac{c^2/v}{(2\pi a)^2} \cdot (u_1^2 - u_2^2)$$

where $v$ is the frequency of one of the excited modes considered, $a$ is the radius of the end mirror, and $u_1$ and $u_2$ are parameters appropriate to the two waveguide modes of interest and are the roots of Bessel functions. For example, the $u$ parameters for the excited $HE_{11}$ and $TE_{01}$ excited modes are respectively 2.4 and 3.8 and the frequency difference between lines excited in these modes is approximately 1.5 megacycles per second. This relatively close frequency difference does not permit their separation by a Fabry-Perrot interferometer.

It is an object of the present invention to provide a novel high-resolution mode-selective filter for laser-emissive energy by which the energy of an individual emission line of individual propagation mode may readily be selected for utilization.

It is a further object of the invention to provide a passive high-resolution filter for laser-emissive energy and one which may readily select and translate individual ones of plural emission lines of individual excitation mode and having relatively small interline frequency differences of the order of 0.1 megacycles per second.

It is a further object of the invention to provide a passive high-resolution frequency selective filter which relies for its selective characteristics upon characteristically different modes of propagation for adjacent and relatively closely spaced emission-line frequency bands.

It is an additional object of the invention to provide a unique mode-selective filter for laser-emissive energy wherein preselection of desired propagation-mode energy to be selected for utilization is accomplished by a passive dimensionally preselected physical structure enabling ready prediction of its more essential operational characteristics.

Figure 4:
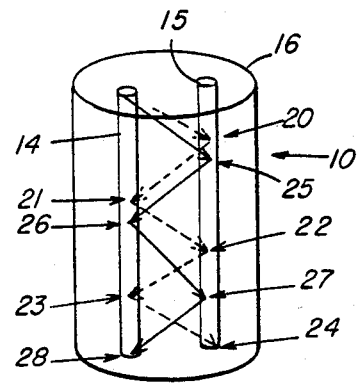
Figure 3:
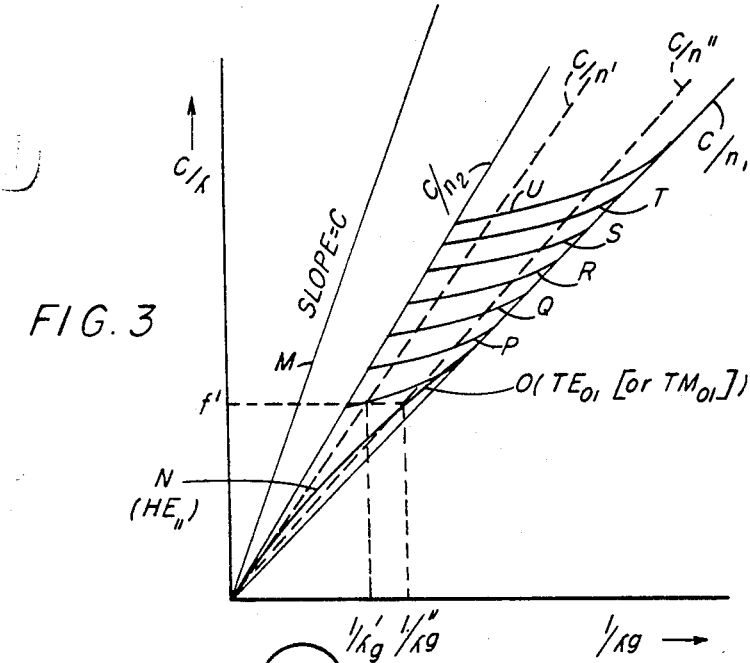
Figure 2:
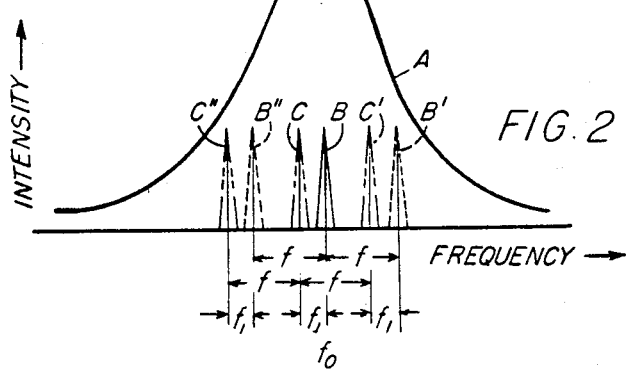

Other objects and advantages of the invention will appear as the detailed description thereof proceeds in the light of the drawings forming a part of this application and in which:

FIG. 1 illustrates schematically a mode-selective filter embodying the invention in a particular form and arranged for operation with a laser-emissive energy source;

FIGS. 2 and 3 graphically represent certain operating characteristics of the laser emissive energy source and of the mode-selective filter and are used as an aid in explaining the operation of the filter; and FIG. 4 illustrates in enlarged isometric view the construction of the mode-selective filter and is used in explaining the energy-selective operational characteristics of the filter.

Referring now particularly to FIG. 1, a mode-selective filter 10 embodying the invention is illustrated in association with a laser light energy source 11 shown schematically. The laser light energy source may have any conventional construction and includes a laser component 12 shown as of elongated rod-like configuration. The source 11 also includes a conventional source of electrically energized pumping energy, not shown, and by which the laser component 12 is caused to emit a narrow axial beam of laser light energy. By way of example, the laser component 12 may be of the gas discharge laser type such as that described in a paper by Javen, Bennett & Herriot appearing in Physical Review Letters, vol 6, p. 106 (1961). It is conventional to operate the laser component 12 within a resonant structure of the Fabry-Perrot interferometer type wherein a light propagation path extending axially of the laser component is terminated at its ends by light reflective surfaces of which one is totally reflective and the other is partially transmissive to permit laser light energy to propagate out of the laser component as a narrow axial laser light beam.

A laser component operated within a resonant structure of the Fabry-Perrot interferometer type just described emits coherent laser light energy generally considered monochromatic by reason of its characteristic narrow band of frequency components. Curve A of FIG. 2 graphically represents the normal spontaneous emission line width and which is also the envelope of the numerous frequency components and component intensities which typify the chromaticity and band width of laser light energy. The actual band width of the laser light in a given instance varies with the level of the pumping light power used, being narrower for pumping light power just in excess of the threshold level and increasing with increasing levels of pumping light power.

Thus, considering a gas discharge laser of the type previously mentioned as representative, it is found that pumping power just in excess of the threshold level tends to create laser light having essentially only one large amplitude line. This line corresponds to N half wavelengths of the lowest order $HE_{11}$ waveguide mode in the resonant cavity structure used, and is comprised by a relatively narrow band of frequency components of ten kilocycles or less in band width. It is represented in FIG. 2 by curve B, and is centered about a frequency $f_0$ itself approximately centered on the envelope represented by curve A. All of the frequency components of this line ordinarily are excited in a resonant cavity mode whose field distribution across the aperture is essentially the same as the $HE_{11}$ mode of electromagnetic wave propagation. With further increase in the level of pumping light power the intensity of the initial line increases and other pairs of symmetrically positioned side lines having $N \pm 1$ half wavelengths, such as those represented in FIG. 2 by broken line curves B' and B", may begin to appear in the emitted laser light if they are excitable in a resonant cavity mode. They quickly reach amplitudes comparable to the initial line centered on the frequency $f_0$. These additional side lines also are comprised by narrow bands of frequencies centered on individual frequencies having equal frequency spacings $f$ from the central frequency $f_0$, as determined by the reflective end termination spacing, and the frequency components of these side lines have the same mode as those of the central line.

Further increase in the level of the pumping light power increases the intensities of all of the lines and expands the line array by causing additional remote lines with frequency spacings $f$ to appear in the laser light. In addition, a new array of frequency-displaced lines begins to appear. The lines of this further array, represented in FIG. 2 by curves C, C' and C", likewise have equal frequency spacings $f$ corresponding to the frequency spacings of the initially appearing line array. Each line of this new array, however, is displaced by a relatively close frequency spacing $f_1$ to one side of an adjacent line of the initially appearing array and the frequency components of the new lines all have the operative field distribution of the $TM_{01}$ ($TE_{01}$) propagation mode. In similar manner, further increases of the level of the pumping light power increases the intensities of the array of lines and causes other similar arrays of lines to appear in the laser light. The lines of each such new array similarly have equal frequency spacings and are positioned in overlapping frequency-displaced relation to the lines of earlier appearing arrays, and the frequency components of each new array of lines are distinguishable by a different propagation mode individual to the array. A relatively high level of pumping light power causes a large number of line arrays, with wide spectrum width and range of intensities, to appear in the laser light.

Relatively widely spaced ones of the multiplicity of laser lines such as lines B' and B", which have the same field distribution across the aperture and correspond to N or $N+1$ half wavelengths between the end reflectors of the laser component 12 can readily be selectively filtered by use of a Fabry-Perrot interferometer. Selection of one line having a given field distribution such as the $TE_{01}$ mode from another line having a different field distribution such as the $HE_{11}$ mode is, however, considerably more difficult to accomplish by use of a Fabry-Perrot interferometer since the frequency difference of two such lines can be as small as one-tenth of a megacycle. The present invention readily accomplishes selective separation of lines of this close frequency spacing on the basis of their difference in field distribution. As will presently be described more fully, all of the light energy emitted by the laser component 12 is focused squarely onto the end of a laser-energy propagation fiber. Energy in each propagation mode (such as the $HE_{11}$ mode, the $TE_{01}$ mode, and higher order modes) of the laser light is then coupled into a corresponding mode in the fiber. While for such squarely focused light energy the cross-sectional parameters of the fiber might be selected sufficiently small that only energy in the lowest order $HE_{11}$ mode would be propagated with minimum attenuation by the fiber, thus enabling selection of a line in this mode to the exclusion of lines in other modes, it will be evident that there is a loss of all emitted laser light energy in higher order modes. The present invention accomplishes selection of individual ones of plural lines relatively closely spaced in the frequency spectrum by use of an array of two or more fibers sufficiently closely spaced that there is energy transfer or "cross-talk" between a central fiber and each adjoining fiber at a transfer rate differing with respect the various dielectric waveguide modes. Thus the light energy in a line having a given propagation mode is preserved and at the same time the line is selectively separated from a line of lower-order mode.

In the filter structure of FIG. 1, the laser light axially emitted by the laser component 12 is focused by an axially positioned lens system 13 (conveniently in the form of a microscope objective lens system used in inverted manner) upon the polished end surface of an elongated fiber 14 of dielectric material provided in the filter 10. This fiber and a closely spaced associated fiber 15, also of dielectric material, are imbedded in a cladding 16 of dielectric material. The dielectric materials used for the fibers 14 and 15 have higher indices of refraction than the dielectric material used for the cladding 16, and the longitudinal peripheral surface of each fiber is relatively smooth and in intimate engagement with the cladding to provide high reflectivity at the fiber-cladding interface.

The manner of fabricating such clad fiber assemblies is now well known in the art, a representative technique being disclosed in the U.S. Patent No. 2,992,516 to F. H. Norton and representative fabricating machines being disclosed in the U.S. Patents Nos. 2,922,517 and 2,980,957 to John W. Hicks, Jr. The method of the latter patent uses hollow tubes of the cladding material into which are inserted solid rods of the fiber material. This assembly of tubes and rods, carefully cleaned prior to assembly, is inserted vertically into a furnace having a number of successively arranged heating zones and the upper end of the assembly is held by a clamp which moves slowly down through the furnace as the drawing operation proceeds. By conventional use of a baiting rod, the heat-softened lower end of the tubing-rod assembly is passed between forming rolls and drawn through an aperture in the bottom wall of the furnace at a velocity so related to the several furnace temperatures that the cladding-rod assembly is reduced to a desired external diameter. The drawing velocity is preferably maintained uniform by use of a straight-line-draw machine having a screw-driven clamp attached to the baiting rod or using traction-drawing rolls engaging the drawn rod.

While many suitable dielectric materials both inorganic and organic may be used for the fibers 14 and 15 and the cladding 16 as is now well known, it is convenient to use inorganic glasses. The relationship between the frequency of the various frequency components of the laser light which may be propagated by the clad fibers and the corresponding inverse of the guide wave lengths of these frequency components in the fibers operating as dielectric waveguides is graphically represented in FIG. 3 for a fiber index of refraction $n_1$ and a cladding index of refraction $n_2$. The underlying mathematical basis from which FIG. 3 is derived is set forth in a paper by applicant appearing in the Journal of the Optical Society of America, vol. 51, No. 5, pp. 491–498 (May 1961). The scale relationship between the axes of ordinants and abscissae is represented by curve M. Curves N–U represent schematically the frequency versus inverse guide wave length for various propagation modes of increasing order from the lowest $HE_{11}$ mode represented by curve N to the highest propagation mode represented by curve U. Propagation in these various modes is such as to be confined to the region between the lines having slopes $c/n_1$ and $c/n_2$, where $c$ represents the velocity of light in a vacuum. Each mode as a function of inverse wavelength is represented by a line which approaches the $c/n_1$ line far from cutoff and terminates at the $c/n_2$ line at cutoff. All of the modes which have cutoffs terminate sharply at the $c/n_2$ line, but the $HE_{11}$ mode (which does not have a cutoff) approaches the $c/n_2$ line slowly and finally merges with it at the origin.

Assume now that the fibers 14 and 15 of dielectric material, having an index of refraction $n_1$ and used with a cladding 16 having an index of refraction $n_2$, have such transverse parameters that the fibers are capable of propagating all frequency components having frequencies greater than a frequency $f'$ in the laser light focused by the lens system 13 on the end surface of the fiber 14. Assume further that the frequency $f'$ is just somewhat higher than the cutoff frequency for the $TE_{01}$ (or $TM_{01}$) mode of propagation as indicated in FIG. 3. Under these conditions, the fibers 14 and 15 are capable of propagating only the $HE_{11}$ mode and the $TE_{01}$ mode but are incapable of propagating any higher order modes since these all have cutoff frequencies of higher value than the frequency $f'$. If the output laser light of the laser component 12 is squarely imaged on the end of the fiber 14 so that the $HE_{11}$ mode energy is coupled entirely into the $HE_{11}$ mode of the fiber and similarly for the other modes, it is evident that this propagation mode-selective characteristic of the fibers causes them selectively to propagate only the laser light energy which is created in the $HE_{11}$ and $TE_{01}$ (or $TM_{01}$) modes, which as earlier explained are the modes earliest appearing in the emitted laser light as the level of pumping light power increases above the threshold level, and to reject all other laser light energy appearing in other higher order propagation modes.

In considering for each particular application appropriate selection of the transverse parameters of the fibers 14 and 15 to attain the propagation-mode selective characteristics just described, it is pointed out in applicant's above mentioned technical paper that where the transverse dimensions of a dielectric waveguide are comparable to the wavelength of the light energy which it is desired to propagate only certain propagation modes will satisfy Maxwell's equations and the prevailing boundary conditions. The general solution of Maxwell's equations for a dielectric wave guide involve Bessel functions having a parameter $u$ found from the boundary conditions and which fixes the scale of the Bessel function relative to the boundary radius $a$ of a wave guide of circular cross section. If $u_{nm}$ be the value that $u$ assumes at cutoff for the $m$th root of the cutoff condition involving the $n$th order Bessel function, the modes which can propagate are those for which $u_{nm}$ is less than $2\pi(a/\lambda)(n_1^2-n_2^2)^{1/2}$ where $\lambda$ is the free-space wavelength. It can be shown that when the fibers 14 and 15 have circular cross sections of radius $a$, the fiber is capable of propagating only the $HE_{11}$ mode for values of $u_{nm}$ less than 2.405. For values of $u_{nm}$ larger than 2.405 and less than 3.832, the $TE_{01}$ (or $TM_{01}$) and $HE_{21}$ modes additionally are propagated.

Accordingly it will be evident that the cross-sectional parameters of the fibers 14 and 15 of the filter 10 may be selected, in relation to the indices of refraction of the material of each fiber and its cladding material, such that only selected propagation modes of the laser light focused by the lens system 13 onto the polished end surface of the fiber 14 are propagated by the fibers and all other laser energy in higher order propagation modes is rejected by the filter 10. Strong cross-talk between two fiber cores in a common cladding takes place, as is desirable in the present filter, when the phase velocities of propagation in each particular mode of interest are equal or nearly equal to one another. Equality of phase velocity is easily attained by having identical cores, but may also be attained at selected wavelengths by selection of the fiber cross-sectional sizes and/or configurations and/or materials having particular indices of refraction.

FIG. 4 is an enlarged illustration of the filter 10 shown in isometric view. The fibers 14 and 15 are shown for clarity of illustration as having much larger cross-sectional sizes and spacings than would be found in practice. When these fibers have circular cross-section as illustrated, the fibers in practice would typically have a diameter of approximately 1 micron and an axial spacing of approximately 3 microns when their transverse parameters are selected in the manner previously described to attain selective-mode propagation characteristics. For two fibers closely spaced in a common cladding, the electromagnetic field of the light energy focused upon the end surface of the fiber 14 and propagated along its length penetrates into the cladding and transfers energy to the fiber 15. The electromagnetic field of the energy propagated by the fiber 15 likewise penetrates the cladding and transfers energy into the fiber 14.

Assuming that the fibers 14 and 15 both have transverse parameters selected to propagate the $HE_{11}$ and $TM_{01}$ modes of laser light energy impressed on the end of the fiber 14, the energy propagating in the $TM_{01}$ mode has higher phase velocity in the fibers than does the $HE_{11}$ mode. As the impressed light energy propagates along the fiber 14, it gradually transfers energy to the fiber 15. The energy propagating along a succeeding length of the fiber 15 eventually transfers back to the fiber 14 for further propagation along this fiber. This intertransfer of energy between the fibers continues for the entire length over which the fibers are coupled. However, due to the difference in the interaction between the two fibers when light is propagated in the $HE_{11}$ mode with respect to that at which energy propagates in the $TM_{01}$ mode, the complete transfer of energy in the $HE_{11}$ mode occurs at points 20, 21, 22, 23 and 24 as indicated by the broken line in FIG. 4 so that this energy, although entering the upper end of the fiber 14, is entirely transferred to and leaves the lower end of the fiber 15. The energy in the $TM_{01}$ mode of larger phase velocity transfers between the fibers at points 25, 26, 27 and 28 so that this energy impressed on the upper end of the fiber 14 all exits from the lower end of the fiber 14.

Thus by selecting the coupled lengths of the fibers 14 and 15 to attain an even number of complete energy transfers between the fibers with respect to one mode of propagation and an odd number of complete transfers between the fibers with respect to energy propagating in another mode, each fiber is enabled to make complete selection of all energy appearing in a particular propagation mode from the sum total of all laser light energy focused upon the end of the fiber 14. While the filter 10 is shown as including only two such coupled fibers, additional fibers may be provided in the cladding 16 in coupled relation to the fiber 14 to select energy of other propagation modes from the laser-emissive light focused upon the end of the fiber 14.

It will be apparent from the foregoing description of the invention that a high-resolution mode-selective filter embodying the invention readily enables selection of individual ones of plural emission lines of laser-emissive energy even though adjacent such lines have relatively small frequency spacing of the order of 0.1 megacycle per second. This selection of individual emission lines, each having a frequency band width of the order of 10 kilocycles or less, is accomplished quite independently of extensive multi-mode laser operation such as is occasioned by use of large values of laser pumping light excitation or by poor quality reflective terminations of the resonant cavity structure employed in creating the stimulated emission of laser light energy.

While a specific embodiment of the invention has been described for purposes of illustration, it is contemplated that numerous changes may be made without departing from the spirit of the invention.

What is claimed is:
1. A high-resolution passive filter for selecting individual emission lines of laser-emissive energy having a total energy spectrum composed of plural closely-spaced narrow emission lines each characterized by a distinctive electromagnetic mode, comprising a pair of elongated laser-energy propagation path-defining dielectric fiber media each having a preselected constant value of index of refraction, said media being fixedly positioned in spaced relation over a preselected length thereof and being submerged over said length within an enclosing dielectric cladding material having a preselected constant value of index of refraction less than that of said media and permitting laser-energy electro-magnetic field intercoupling between said media over said preselected length; an end portion of one said media being adapted to receive the total of said multi-mode multiple-line laser-emissive energy in all of said electromagnetic propagation modes and both of said media having waveguide propagation-mode emission-line selective transverse dimensions selected in relation to said indices of refraction such that of said total laser-emissive energy received by said one medium at least two preselected emission lines characterized by individual waveguide propagation modes of said energy are propagated by each of said media, said intercoupled length of said media being preselected to provide unlike numbers of susbtantially complete mode energy transfers between said media by said electromagnetic field intercoupling along said intercoupled length thereof such that energy emission from an exit end of each of said media is limited to an individual emission line characterized by an individual waveguide propagation mode.

References Cited
UNITED STATES PATENTS 3,208,342  9/1965  Nethercot _____ 88—61

DAVID H. RUBIN, *Primary Examiner.*

PAUL R. MILLER, *Assistant Examiner.*